United States Patent
Smallcomb et al.

(10) Patent No.: US 7,447,171 B2
(45) Date of Patent: Nov. 4, 2008

(54) ANTENNA DIVERSITY SYSTEM

(75) Inventors: Joseph Smallcomb, Lake Worth, FL (US); Paul Marko, Boca Raton, FL (US); Craig Wadin, Sunrise, FL (US)

(73) Assignee: XM Satellite Radio, Inc., Washington, DC (US)

( * ) Notice: Subject to any disclaimer, the term of this patent is extended or adjusted under 35 U.S.C. 154(b) by 721 days.

(21) Appl. No.: 10/866,838

(22) Filed: Jun. 14, 2004

(65) Prior Publication Data
US 2005/0276239 A1      Dec. 15, 2005

(51) Int. Cl.
*H04B 7/185*    (2006.01)

(52) U.S. Cl. .................. 370/316; 370/334; 370/328; 455/552.1; 455/277.1

(58) Field of Classification Search .................. 370/334, 370/316, 328; 455/277.1, 552.1
See application file for complete search history.

(56) References Cited

U.S. PATENT DOCUMENTS

| | | | |
|---|---|---|---|
| 5,513,176 A | | 4/1996 | Dean et al. |
| 5,533,011 A | | 7/1996 | Dean et al. |
| 5,940,452 A | * | 8/1999 | Rich ........................... 375/347 |
| 6,018,651 A | * | 1/2000 | Bruckert et al. .......... 455/277.1 |
| 6,023,615 A | * | 2/2000 | Bruckert et al. .......... 348/14.08 |
| 6,049,705 A | | 4/2000 | Xue |
| 6,687,492 B1 | | 2/2004 | Sugar et al. |
| 6,690,712 B2 | | 2/2004 | Kim et al. |

* cited by examiner

*Primary Examiner*—Danh C Le
(74) *Attorney, Agent, or Firm*—Pablo Meles; Akerman Senterfitt (57) ABSTRACT

A system (100) for combining satellite and terrestrial signals from spatially diverse antennas (102 and 104) includes a tuner (101) and at least first and second analog to digital converters (103, 105) for converting at least two among the plurality of satellite signals and the terrestrial signal to a first digital stream and a second digital stream. A switch arrangement (106, 102 126) selectively switches among the first digital stream and the second digital stream before demodulating the digital streams using a plurality of algorithms (112, 122, 130) that selectively uses respectively demodulated signals of the first digital stream and the second digital stream to control (114, 124, 132) the switch arrangement to provide a plurality of multiplexed signals (161, 162, 163) that are combined (134) to form a combined signal (170). The combined signal can then be forward error corrected (136).

4 Claims, 5 Drawing Sheets

ANTENNA DIVERSITY SYSTEM

CROSS-REFERENCE TO RELATED APPLICATIONS (Not applicable)

FIELD OF THE INVENTION

The invention relates generally to diversity antenna scheme, and more particularly to a method and apparatus for providing spatial and frequency diversity.

BACKGROUND OF THE INVENTION

Satellite radio operators are providing digital radio broadcast services covering the entire continental United States. These services offer approximately 100 channels, of which nearly 50 channels in a typical configuration provides music with the remaining stations offering news, sports, talk and data channels. Digital radio may also be available in the near future from conventional analog radio broadcasters that will provide a terrestrial based system using signals co-located in the AM and FM bands.

Figure 1:
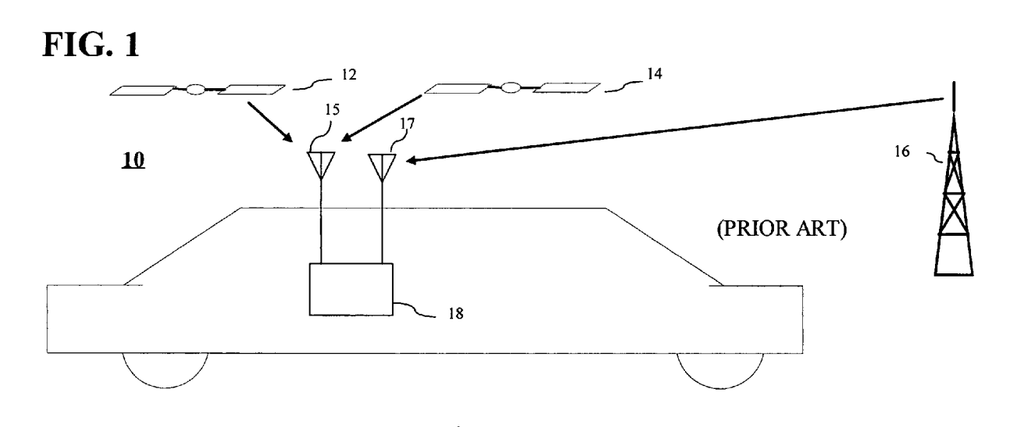
FIG. 1 illustrates an existing Satellite digital audio radio service system architecture.

The Federal Communications Commission (FCC) granted two national satellite radio broadcast licenses. The system plan for each licensee presently includes transmission of substantially the same program content from two or more geosynchronous or geostationary satellites to both mobile and fixed receivers on the ground. In urban canyons and other high population density areas with limited line-of-sight (LOS) satellite coverage, terrestrial repeaters broadcast the same program content in order to improve coverage reliability. Some mobile receivers as illustrated in FIGS. 1 and 2 are capable of simultaneously receiving signals from two satellites and one terrestrial repeater for combined spatial, frequency and time diversity, which provides significant mitigation of multipath interference and addresses reception issues associated with blockage of the satellite signals.

In accordance with XM Satellite Radio, Inc.'s frequency plan, each of two geostationary satellites transmits identical or at least similar program content. The signals are transmitted with QPSK modulation from each satellite (hereinafter satellite 12 and satellite 14). For reliable reception, the LOS signals transmitted from satellite 12 are received, reformatted to Multi-Carrier Modulation (MCM) and rebroadcast by terrestrial repeaters 16. The assigned 12.5 MHZ bandwidth (hereinafter the "XM" band) is partitioned into two equal ensembles or program groups A and B. Each ensemble is transmitted by each satellite on a separate radio frequency (RF) carrier. Each RF carrier can support 50 channels or more of music, talk or data in Time Division Multiplex (TDM) format.

Existing SDARS systems (10) or mobile receiver units 18 use two antenna elements 15 and 17 that are typically co-located and omni directional, one for satellite reception, one for terrestrial reception. The satellite antenna is used to receive both satellite signals simultaneously. The terrestrial antenna is used to receive only the terrestrial signal.

Figure 2:
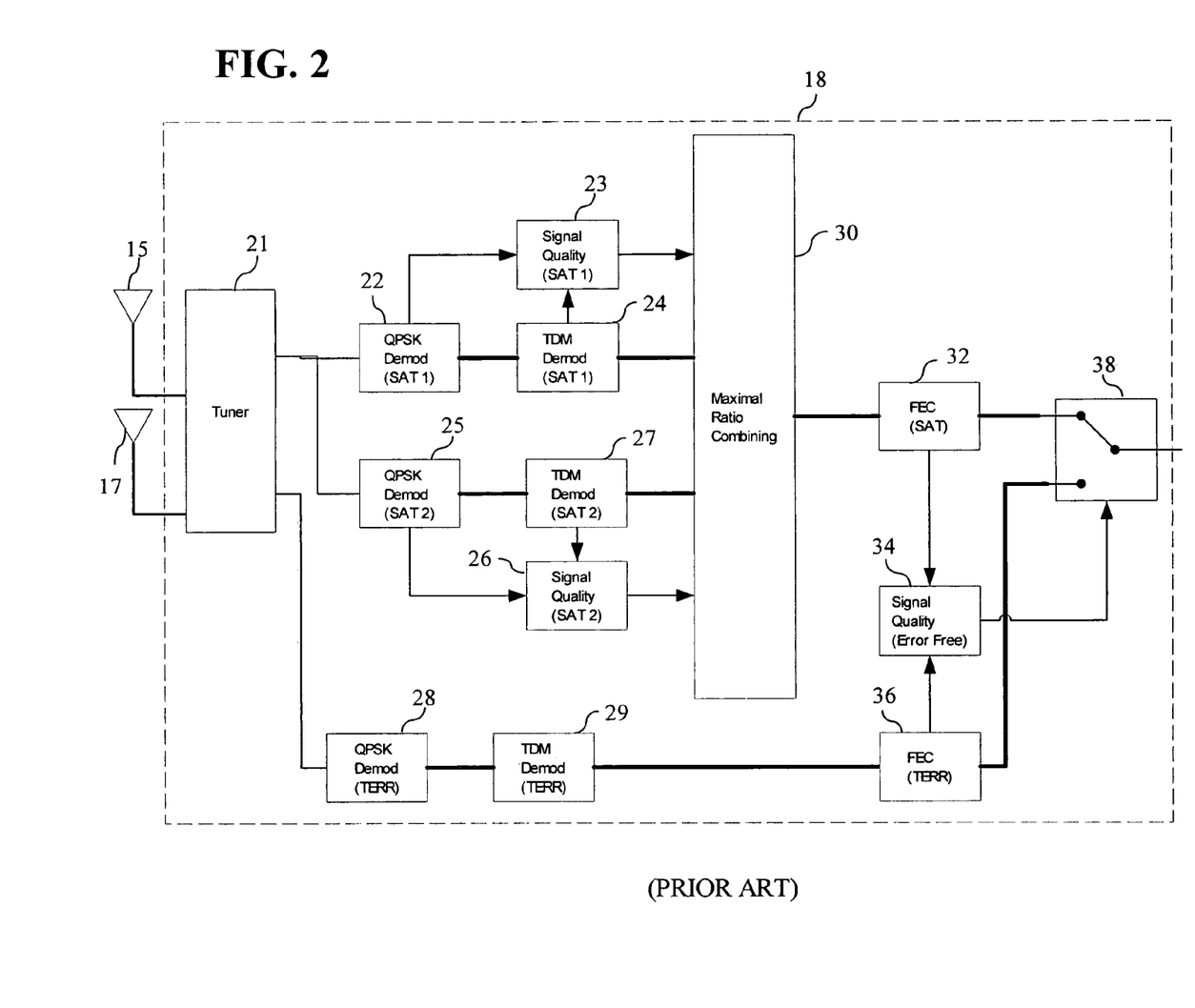
FIG. 2 is a block diagram of an existing satellite digital audio radio.

As shown in FIG. 2, the channel decoder is divided into three stages where the first stage consists of a tuner 21 and digital demodulators 22, 25, and 28 that convert the RF signals to channel bit streams. The second stage includes TDM decoders 24, 27 and 29 that align the three signals and demultiplex the desired subchannels. The third stage performs forward error correction 32 and 36 on the channel bits and output the desired information bits. Additionally, such existing mobile receiver unit 18 can include elements 23 and 26 for signal quality detection to perform maximal ratio combining (30) as well elements 34 and 38 for signal quality detection to select (38) an error free signal among an forward error corrected satellite or terrestrial signal.

In existing SDAR radios, the two satellite signals are demodulated from the satellite antenna signal (from antenna 15) and the terrestrial signal is demodulated from the terrestrial antenna signal (from antenna 17). The three signals are aligned and demultiplexed independently by the TDM stage. Another way of describing this architecture is a two arm (antenna)/three branch (demodulator) radio as illustrated and discussed with regard to FIG. 2.

Although the existing two arm/three branch radio 18 of FIGS. 1 and 2 operates well, further improvements can be made to maximize signal reception and quality taking advantage of spatial diversity and signal combining techniques as will be further described below. Thus, in a digital audio radio system such as the system described above, a need exists for a system and technique for taking greater advantage of the signals being transmitted from satellite and terrestrial sources by using spatial diversity using multiple distributed antennas and signal combining techniques.

SUMMARY OF THE INVENTION

In a first aspect of the present invention, a method of combining satellite and terrestrial signals comprises the steps of receiving a plurality of satellite signals and at least a terrestrial signal at a plurality of spatially diverse antennas, converting at least one among the plurality of satellite signals and the terrestrial signal from an analog signal to a digital signal forming a first digital stream, and converting at least a second signal among the plurality of satellite signals and the terrestrial signal from an analog signal to a digital signal forming a second digital stream. The method further comprises the steps of selectively switching among the first digital stream and the second digital stream before demodulating the digital streams using a plurality of algorithms that selectively uses respectively demodulated signals of the first digital stream and the second digital stream to control the selective switching to provide a plurality of multiplexed signals. The multiplexed signals can then be combined to form a combined signal.

In a second aspect of the present invention, a method of combining satellite and terrestrial signals comprises the steps of receiving a plurality of satellite signals and at least one terrestrial signal using digital data streams from selectively chosen antennas among a plurality of spatially diverse antennas and monitoring the plurality of satellite signals and at least one terrestrial signal using digital data streams from non-selected antennas among the plurality of spatially diverse antennas. The method further comprises the step of selectively switching among several digital data streams from the plurality of spatially diverse antennas to enable processing of each of the plurality of satellite signals and the at least one terrestrial signal through the selectively chosen antennas and the non-selected antennas, wherein a selective switching decision is determined by a signal quality measurement comparison between a signal from a selectively chosen antenna and a signal from a non-selected antenna for each of the plurality of satellite signals and the at least one terrestrial signal.

In a third aspect of the present invention, a method of combining satellite and terrestrial signals comprises the steps of receiving a plurality of satellite signals and at least one terrestrial signal using a plurality of spatially diverse antennas, demodulating the plurality of satellite signals and the at least one terrestrial signal to provide demodulated signals for at least two of the plurality of spatially diverse antennas for each of the plurality of satellite signals and the at least one terrestrial signal, and monitoring a signal quality of the demodulated signals coming from at least two of the plurality of spatially diverse antennas. Then the method combine the demodulated signals coming from at least two of the plurality of spatially diverse antennas using the signal quality measured for each demodulated signal to provide a combined signal.

In a fourth aspect of the present invention, a system for combining satellite and terrestrial signals from spatially diverse antennas comprises a tuner for receiving a plurality of satellite signals and a terrestrial signal at a plurality of spatially diverse antennas and at least a first analog to digital converter for converting at least one among the plurality of satellite signals and the terrestrial signal from an analog signal to a digital signal forming a first digital stream and for converting at least a second signal among the plurality of satellite signals and the terrestrial signal from an analog signal to a digital signal forming a second digital stream. The system can further include a switch arrangement for selectively switching among the first digital stream and the second digital stream before demodulating using a plurality of algorithms that selectively uses respectively demodulated signals of the first digital stream and the second digital stream to control the switch arrangement to provide a plurality of multiplexed signals and a combiner for combining the multiplexed signals to form a combined signal.

In a fifth aspect of the present invention, a system for combining satellite and terrestrial signals can include a tuner for receiving a plurality of satellite signals and at least one terrestrial signal using digital data streams from selectively chosen antennas among a plurality of spatially diverse antennas, a signal quality analyzer for monitoring the plurality of satellite signals and at least one terrestrial signal using digital data streams from non-selected antennas among the plurality of spatially diverse antennas, and a switch arrangement for selectively switching among several digital data streams from the plurality of spatially diverse antennas to enable processing of each of the plurality of satellite signals and the at least one terrestrial signal through the selectively chosen antennas and the non-selected antennas, wherein a selective switching decision is determined by a signal quality measurement comparison between a signal from a selectively chosen antenna and a signal from a non-selected antenna for each of the plurality of satellite signals and the at least one terrestrial signal.

In a final aspect of the present invention, a system of combining satellite and terrestrial signals can include a tuner for receiving a plurality of satellite signals and at least one terrestrial signal using a plurality of spatially diverse antennas, at least one demodulator for demodulating the plurality of satellite signals and the at least one terrestrial signal to provide demodulated signals for each of at least two of the plurality of spatially diverse antennas for each of the plurality of satellite signals and the at least one terrestrial signal, and a signal quality analyzer for monitoring a signal quality of the demodulated signals coming from at least two of the plurality of spatially diverse antennas. The system can further include a combiner for combining the demodulated signals coming from at least two of the plurality of spatially diverse antennas, using the signal quality measured for each demodulated signal to provide a combined signal.

DETAILED DESCRIPTION OF THE DRAWINGS

As previously stated, satellite radio operators are providing digital radio service to the continental United States. Briefly, the service provided by XM Satellite Radio includes a satellite X-band uplink (not shown) to two satellites (12 and 14) which provide frequency translation to the S-band for re-transmission to radio receivers (18) on earth within a predetermined coverage area. Radio frequency carriers from one of the satellites are also received by terrestrial repeaters (repeater 16 for example). The content received at the repeaters is retransmitted at a different S-band carrier to the same radio receivers (18) that are within their respective coverage areas. These terrestrial repeaters facilitate reliable reception in geographic areas where LOS reception from the satellites is obscured by tall buildings, hills, tunnels and other obstructions. The SDARS receivers are designed to receive one or both of the satellite signals at one antenna and the signals from the terrestrial repeaters at another antenna and combine or select one of the signals as the receiver output. As shown in FIG. 2, the three branches (and/or the satellite and terrestrial signals) are combined at the FEC stage.

Figure 4:
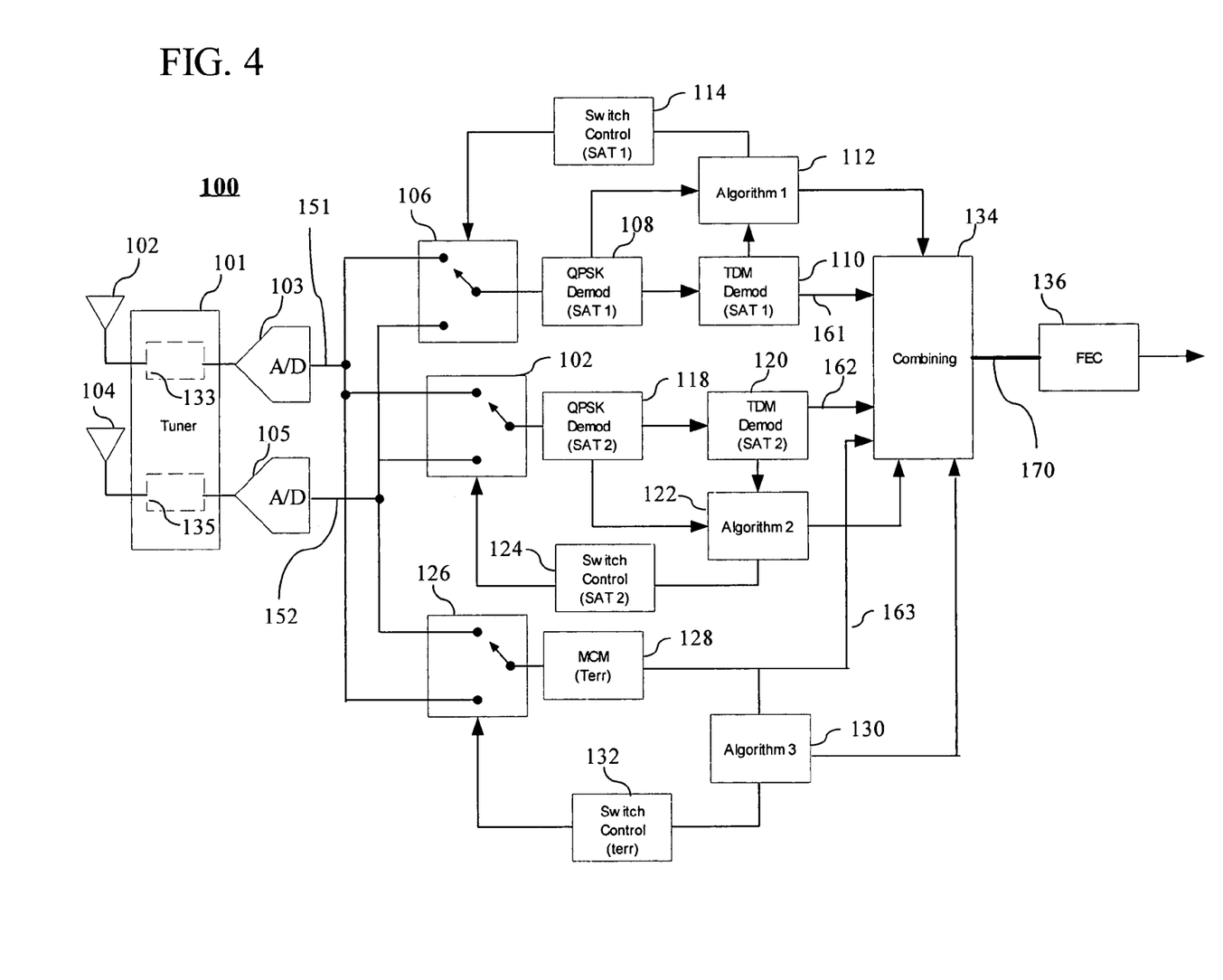
FIG. 4 is a block diagram of a satellite digital radio receiver unit in accordance with the present invention.
Figure 5:
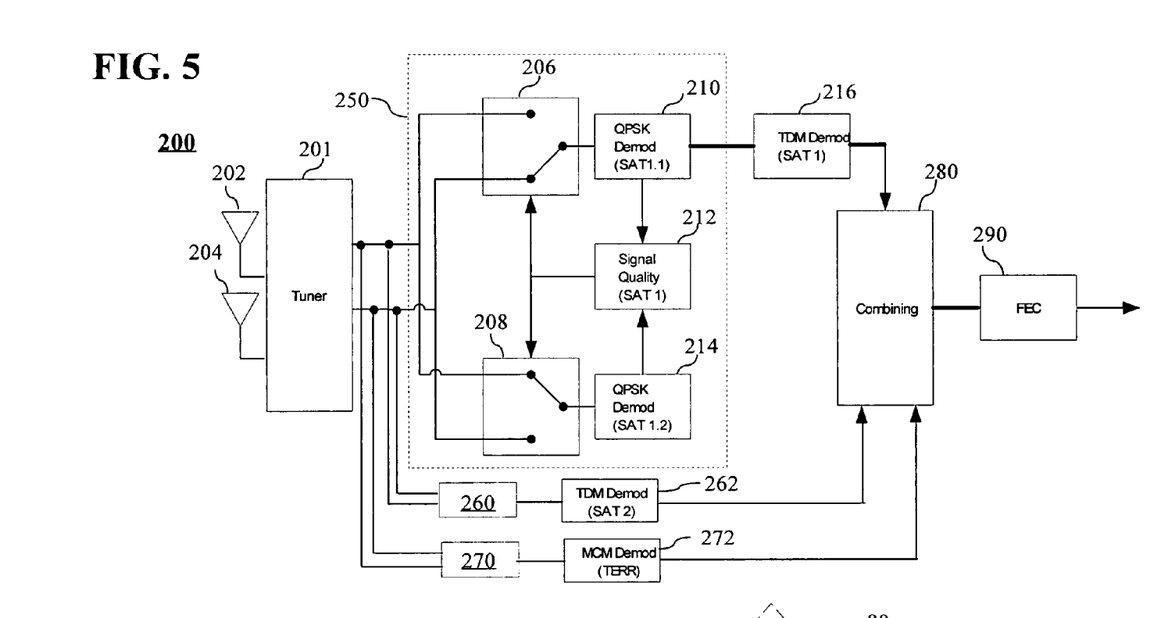
FIG. 5 is a block diagram of another satellite digital radio receiver unit in accordance with the present invention.
Figure 6:
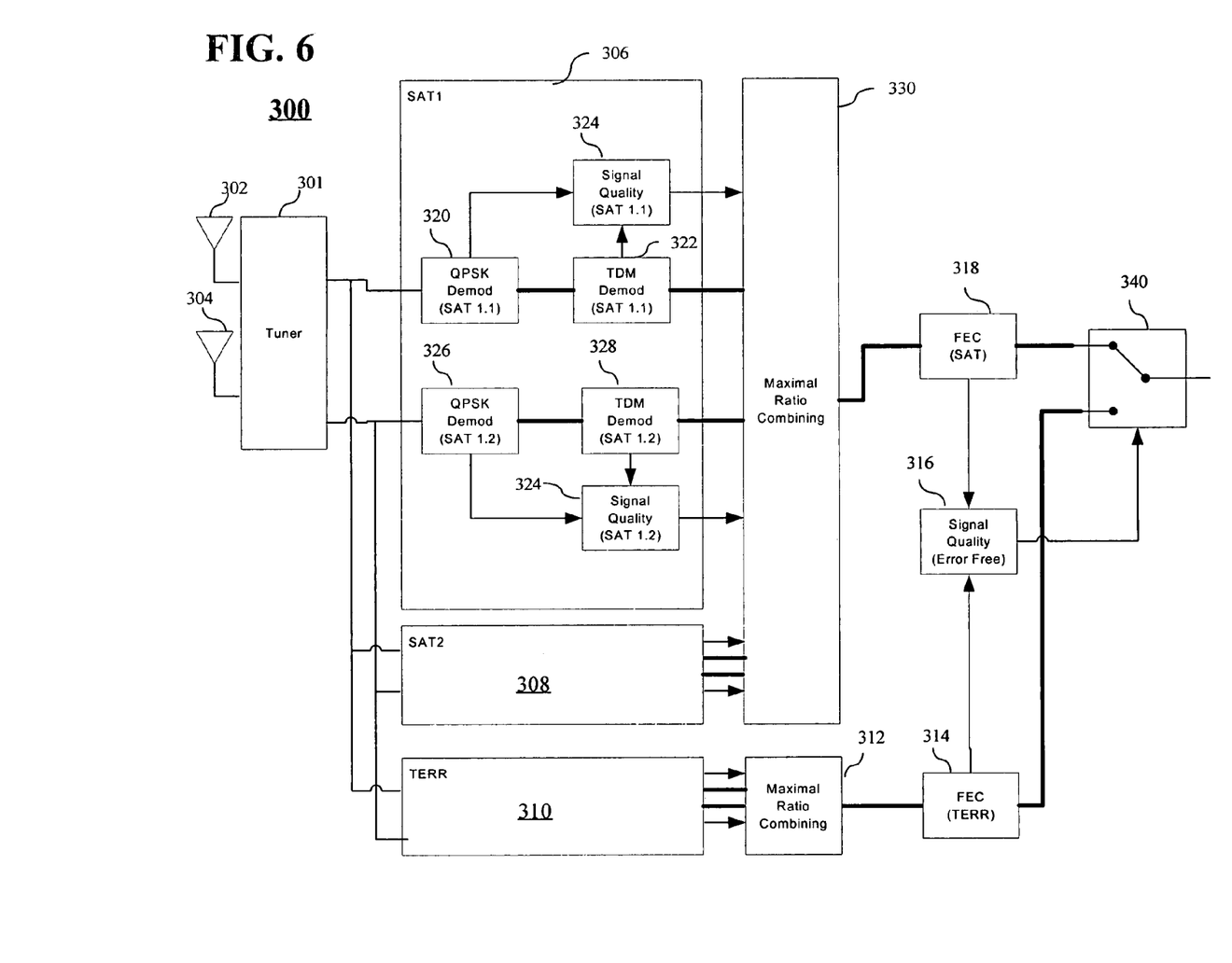
FIG. 6 is a block diagram of yet another satellite digital radio receiver unit in accordance with the present invention.

In contrast, the present invention is not limited to combining signals in the FEC stage. For example, signal combining can occur before and after the FEC decoder. If the combining is done before then it can be either maximal ratio combined as shown in FIG. 6 or selectively combined as shown in the embodiments of FIGS. 4 and 5. In maximum ratio combining the different channel bit streams are weighted, based on some signal quality metric and added together. In selective combining the best of multiple branches is selected.

In this invention, multiple antennas are spatially distributed and are capable of receiving all three SDARS signals (two satellite and one terrestrial). The radio can select the antenna that provides the best reception of each individual SDAR signals. The radio could also combine the desired SDAR signal from multiple antennas to maximize reception, as in maximal ratio combining. Therefore, the radio is not limited to demodulating a particular signal from a given antenna or from a single antenna. In other words, there can be N antennas/arms and up to 3N branches for demodulating and combining.

Figure 3A:
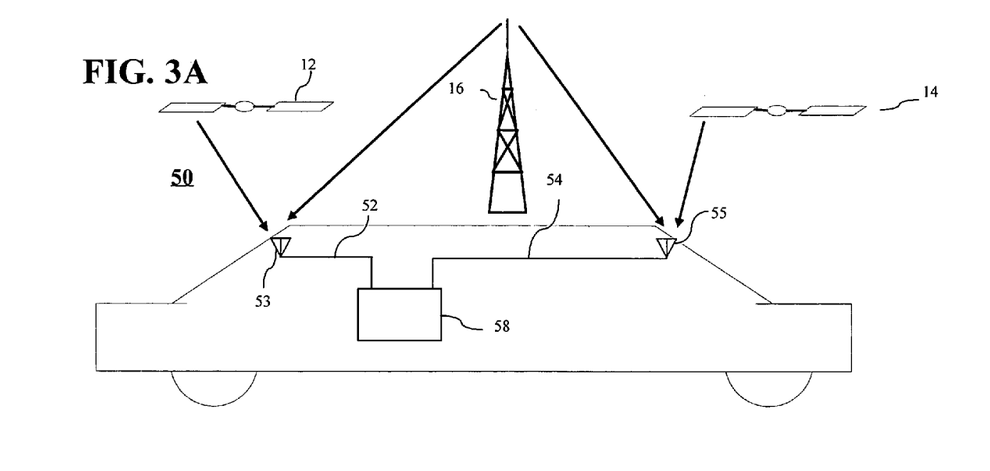
FIG. 3A illustrates a Satellite digital audio radio service system architecture in a mobile environment in accordance with the present invention.

Such a system 50 as shown in FIG. 3A can be in a mobile environment including satellites 12 and 14, terrestrial repeater 16 transmitting SDARS signals to spatially diverse antennas 53 and 55 for reception by radio receiver unit 58 via respective feed lines 52 and 54 respectively. Feed lines 52 and 54 are preferably coaxial cables, although other means of linking a signal from an antenna to the receiver unit are certainly contemplated within the present invention. In this embodiment, antennas are preferably placed on a windshield looking forward and another on the rear window looking backwards. In this example, each antenna has 180 degrees view in the horizontal plane and can receive both terrestrial and satellite signals.

Figure 3B:
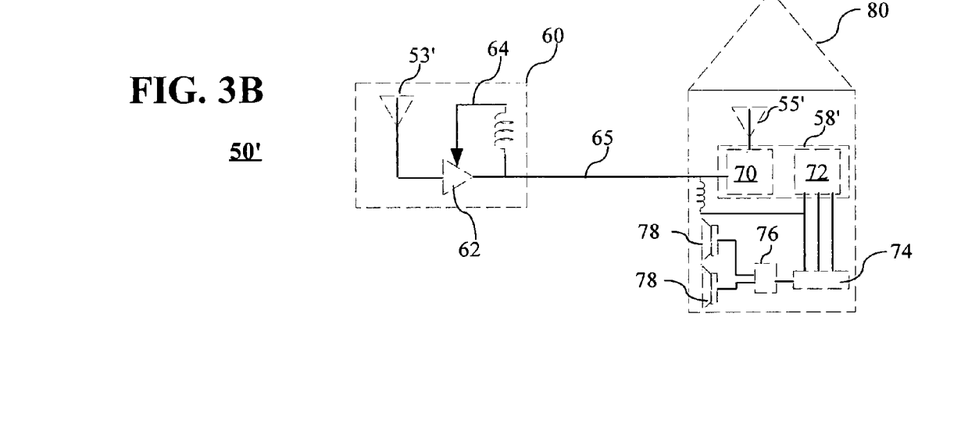
FIG. 3B illustrates a Satellite digital audio radio service system architecture in a fixed or home environment in accordance with the present invention.

Likewise, a similar system 50' as shown in FIG. 3B can be in a fixed environment such as a home 80 where spatially diverse antennas 53' and 55' receive satellite & terrestrial signals for reception by radio receiver unit 58'. Antenna 53' can be part of an antenna module 60 that further includes amplifier 62 powered by power from coaxial cable 65 (and feed-back line 64). Radio receiver unit 58' can include a tuner 70 and a receiver 72. The receiver 72 can coupled to an interface unit 74 that provides power, control and audio signals between a head unit 76 (and speakers 78) and the remainder of the system 50' as shown.

The combining of the branches using the present invention can occur in several possible locations within the radio receiver unit including the pre-demodulator stage, the post-demodulator/pre-FEC stage, or the Post-FEC stage.

In pre-demodulation combining as shown in radio receiver unit 100 of FIG. 4, there is typically only one demodulator for a given SDARS signal since the switching occurs prior to the demodulation stage. Note that each satellite signal in this particular system uses two demodulators, namely QPSK demodulator 108 and TDM demodulator 110 for decoding a given channel from a first satellite and QPSK demodulator 118 and TDM demodulator 120 for decoding the given channel from a second satellite. A QPSK demodulator is used to demodulate the satellite signal and a TDM demodulator decodes a particular channel from the demodulated bitstream from the QPSK demodulator. Also note that the terrestrial signal only requires a MCM demodulator 128. In this architecture there is typically only two antennas 102 and 104 and the radio only switches just prior to when it determines it will lose the signal on the current arm. This is sometimes called blind switching.

More particularly, the receiver unit preferably includes a tuner 101 (or multiple tuners 133 and 135) for receiving a plurality of satellite signals and a terrestrial signal at the plurality of spatially diverse antennas 102 and 103. The receiver unit 100 further comprises at least a first analog to digital converter 103 (and/or 105) for converting at least one among the plurality of satellite signals and the terrestrial signal from an analog signal to a digital signal forming a first digital stream 151 and for converting at least a second signal among the plurality of satellite signals and the terrestrial signal from an analog signal to a digital signal forming a second digital stream 152. The receiver unit also preferably includes a switch arrangement (102, 106 and 126) for selectively switching among the first digital stream 151 and the second digital stream 152 before demodulating. The switch arrangement uses switch controls 114, 124 and 132 that are essentially directed by a plurality of algorithms (112, 122, and 130) that analyze the demodulated signals to both switch from one bit stream to another and to selectively choose demodulated signals of the first digital stream or the second digital stream for combining a plurality of multiplexed signals 161, 162, and 163. The receiver unit 100 then preferably combines the multiplexed signals in a combiner 134 (using the algorithms 112, 122 and 130) to form a combined signal 170 which can be forward error corrected by FEC decoder 136.

Operationally, the system 100 illustrates a method of combining satellite and terrestrial signals by receiving a plurality of satellite signals and a terrestrial signal at a plurality of spatially diverse antennas, converting at least one among the plurality of satellite signals and the terrestrial signal from an analog signal to a digital signal forming a first digital stream, converting at least a second signal among the plurality of satellite signals and the terrestrial signal from an analog signal to a digital signal forming a second digital stream, and selectively switching among the first digital stream and the second digital stream before demodulating using a plurality of algorithms that selectively uses respectively demodulated signals of the first digital stream and the second digital stream to control the selective switching to provide a plurality of multiplexed signals. The step of selectively switching before demodulation is a blind switching scheme that does not analyze a non-selected branch before making a decision to switch. Finally, the multiplexed signals can be combined to form a combined signal. Additionally, the method can further include the step of forward error correcting the combined signal.

A slight variation of the pre-demodulation combining architecture of FIG. 4 further includes secondary demodulators used only to monitor the quality of the desired SDARS signal as shown in FIG. 5. These secondary demodulators monitor the signal from non-selected antennas. If the secondary demodulator detects a signal of better quality than the current selected antenna. The radio switches to the new antenna.

Referring again to FIG. 5, a system 200 is shown for combining satellite and terrestrial signals comprising a tuner 201 for receiving a plurality of satellite signals and at least one terrestrial signal using digital data streams from selectively chosen antennas among a plurality of spatially diverse antennas 202 and 204. The system 200 further includes a signal quality analyzer 212 for monitoring the plurality of satellite signals and at least one terrestrial signal using digital data streams from non-selected antennas among the plurality of spatially diverse antennas. More particularly, each branch (3 in this embodiment) has its own or at least utilizes a signal quality analyzer 212. In other words, a signal analyzer (or one signal analyzer for each branch) could analyze a first satellite signal, a second satellite signal, as well as a terrestrial signal each from a selected and a non-selected antennas. The selection of antennas can be achieved using a switch arrangement 250, 260 or 270 for selectively switching among several digital data streams from the plurality of spatially diverse antennas. Each switching arrangement for the satellite signals preferably includes switches 206 and 208, QPSK demodulators 210 and 214 and the signal quality analyzer 212. The switching arrangement 270 for the terrestrial signal can similarly include switches 206 and 208 and other demodulators (not shown) needed for demodulating a terrestrial signal. The switching arrangements enable processing of each of the plurality of satellite signals and the at least one terrestrial signal through the selectively chosen antennas and the monitoring of non-selected antennas. The selective switching decision is determined by a signal quality measurement comparison between a signal from a selectively chosen antenna and a signal from the non-selected antenna for each of the plurality of satellite signals and the at least one terrestrial signal.

Operationally, the system 200 of FIG. 5 illustrates a method of combining satellite and terrestrial signals by receiving a plurality of satellite signals and at least one terrestrial signal using digital data streams from selectively chosen antennas among a plurality of spatially diverse antennas, monitoring the plurality of satellite signals and at least one terrestrial signal using digital data streams from non-selected antennas among the plurality of spatially diverse antennas, and selectively switching among several digital data streams from the plurality of spatially diverse antennas to enable processing of each of the plurality of satellite signals and the at least one terrestrial signal through the selectively chosen antennas and the non-selected antennas. As previously mentioned, the selective switching decision is determined by a signal quality measurement comparison between a signal from a selectively chosen antenna and a signal from a non-selected antenna for each of the plurality of satellite signals and the at least one terrestrial signal. Note that system 200 demodulates a chosen digital data stream for each of the selectively chosen antennas preferably using TDM demodulators 216 or 262 for the satellite signals or a MCM demodulator 272 for the terrestrial signal. A non-selected antenna can become a selectively chosen antenna and the selectively chosen antenna can become a non-selected antenna when the signal quality measurement comparison indicates that the signal from the non-selected antenna is better than the signal from the selectively chosen antenna by a predetermined threshold. The threshold can be an bit error rate, RSSI measurement, Signal to Noise Ratio or other quality measurement. The method can also include the step of combining the chosen digital data stream for each of the selectively chosen antennas in a combiner 280 to provide a combined demodulated signal which can be forward error corrected by a FEC decoder 290.

In post-demodulator/pre-FEC stage combining embodiment as shown in FIG. 6, there is a demodulator (QPSK and TDM for satellite signals) for each SDARS signal for each antenna. The branches can be either combined by either switching and/or maximal ratio combining. In both cases, the combining is based on a signal quality metric generated by the (QPSK) demodulator and/or TDM stage. For example the metric could be based on the Signal to Noise Ratio (SNR) detected by Demodulator, the synchronization state of the TDM stage.

In the system 300 of FIG. 6, a plurality of satellite signals and at least one terrestrial signal are received by a tuner 301 using a plurality of spatially diverse antennas 302 and 304. The system 300 of combining satellite and terrestrial signals further comprises at least one demodulator for demodulating the plurality of satellite signals and the at least one terrestrial signal to provide demodulated signals for each of at least two of the plurality of spatially diverse antennas for each of the plurality of satellite signals and the at least one terrestrial signal. In the embodiment shown, a first satellite demodulation stage 306 preferably includes QPSK demodulator 320 and TDM demodulator 322 for demodulating a first satellite signal from a first antenna and QPSK demodulator 326 and TDM demodulator 328 for demodulating the first satellite signal from a second antenna. Likewise, a second satellite demodulation stage 308 can include QPSK and TDM demodulators for demodulating a second satellite signal from first and second antennas. A terrestrial demodulation stage 310 can also have demodulators for demodulating a terrestrial signal from first and second antennas. Preferably, each of the stages (306, 308 and 310) include one or more signal quality analyzers for monitoring a signal quality of the demodulated signals coming from at least two of the plurality of spatially diverse antennas. Two antennas are used for simplicity, but additional antennas can certainly be used within the scope of the invention.

As previously explained, each of the stages (306 and 308 in particular) can simply be switched in providing a potential output signal based on the aforementioned signal quality metrics, but such signal quality metrics can also be used in maximal ratio combining signals from different antennas (302 and 304) and different sources (first and second satellite sources as well as terrestrial sources). Thus, the system 300 would further include a combiner for combining the demodulated signals coming from at least two of the plurality of spatially diverse antennas using the signal quality measured for each demodulated signal to provide a combined signal. System 300 in particular has a first combiner 330 for combining the first satellite signal and second satellite signal from two spatial diverse antennas in a weighted fashion as can be influenced by the signal quality measurements done on the demodulated signals. Thus, the first combiner 330 can receive four demodulated signals (from two satellite sources and two antennas) and four quality measurements. The system 300 can also include a second combiner 312 for combining a terrestrial signal from two spatially diverse antennas in a weighted fashion as influenced by quality measurements. Thus, the second combiner can receive two demodulated signals (from one terrestrial source and two antennas) and two quality measurements. After forward error correction of the satellite signal by FEC 318 and forward error correction of the terrestrial signal by FEC 314, both signals can be compared for quality (or for an error free signal) before ultimately choosing a source for output by a switch 340.

Once again, FIG. 6 illustrates a method of combining satellite and terrestrial signals by receiving a plurality of satellite signals and at least one terrestrial signal using a plurality of spatially diverse antennas and demodulating the plurality of satellite signals and the at least one terrestrial signal to provide demodulated signals for at least two of the plurality of spatially diverse antennas for each of the plurality of satellite signals and the at least one terrestrial signal. The method further includes the step of monitoring a signal quality of the demodulated signals coming from at least two of the plurality of spatially diverse antennas and combining the demodulated signals coming from at least two of the plurality of spatially diverse antennas using the signal quality measured for each demodulated signal to provide a combined signal. The combined signal can then be forward error corrected.

The step of combining can simply be a switching step controlled by using the signal quality of the demodulated signals coming from at least two of the plurality of spatially diverse antennas. A more sophisticated step of combining can be a maximal ratio combining step using a weighting function determined from the signal quality of the demodulated signals coming from at least two of the plurality of spatially diverse antennas. Additionally, the maximal ratio combining can be done separately for the plurality of satellite signals to provide a combined satellite signal and for the at least one terrestrial signal to provide a combined terrestrial signal. The combined satellite signal and the combined terrestrial signal can then each be separately forward error corrected. The signal quality for the forward error corrected combined satellite signal can then be compared with the signal quality of the forward error corrected combined terrestrial signal to selectively choose an output among the forward error corrected combined satellite signal and the forward error corrected combined terrestrial signal.

In Post-FEC combining as illustrated in FIGS. 2 and 6, selection of an output signal is ideally based on whether the information bits were decoded error free by using conventional switching schemes among sources.

Although the embodiments illustrated two spatially diverse antennas and three signal sources, the present invention is certainly not limited to such arrangements. For example, additional antennas including co-located antennas and additional signal sources (satellite, terrestrial or otherwise) could take advantage of the concepts discussed and claimed herein. For example, the separate antennas (102 and 104) can each be a co-located combination antenna that includes a quadrifilar antenna for satellite signals and a dipole antenna for terrestrial signals. The description above is intended by way of example only and is not intended to limit the present invention in any way except as set forth in the following claims.

We claim:

1. A method of combining satellite and terrestrial signals, comprising:

receiving a plurality of satellite signals and a terrestrial signal simultaneously at a plurality of spatially diverse antennas coupled to respective tuners;

converting at least one among the plurality of satellite signals and the terrestrial signal from an analog signal to a digital signal forming a first digital stream;

converting at least a second signal among the plurality of satellite signals and the terrestrial signal from an analog signal to a digital signal forming a second digital stream;

selectively switching among the first digital stream and the second digital stream before demodulating using a plurality of algorithms that selectively uses respectively demodulated signals of the first digital stream and the second digital stream to control the selective switching to provide a plurality of multiplexed signals;

continuously demodulating the first digital stream or the second digital stream or both based on the simultaneously received satellite and terrestrial signals which simultaneously feed a switch arrangement performing the selective switching; and combining the multiplexed signals to form a combined signal.

2. The method of claim 1, wherein the method further comprises the step of forward error correcting the combined signal.

3. The method of claim 1, wherein the step of selectively switching before demodulating is a blind switching scheme.

4. A system for combining satellite and terrestrial signals from spatially diverse antennas, comprising:

a first tuner for receiving a plurality of signals and a second tuner for receiving the plurality signals at a plurality of spatially diverse antennas;

at least a first analog to digital converter for converting at least one among the plurality of signals from an analog signal to a digital signal forming a first digital stream and for converting at least a second signal among the plurality of signals from an analog signal to a digital signal forming a second digital stream;

a switch arrangement for selectively switching among the first digital stream and the second digital stream before demodulating using a plurality of algorithms that selectively uses respectively demodulated signals of the first digital stream and the second digital stream to control the switch arrangement to provide a plurality of multiplexed signals;

a plurality of demodulators, wherein the plurality of demodulators continuously receive said plurality of signals from the tuners which simultaneously feed the switch arrangement; and a combiner for combining the multiplexed signals to form a combined signal.

* * * * *